United States Patent [19]

Satterly et al.

[11] 4,233,408
[45] Nov. 11, 1980

[54] POLYURETHANE FOAMS FROM POLYESTER PRECURSOR DERIVED FROM ADIPIC ACID PROCESS WASTE

[75] Inventors: Kenneth P. Satterly, Chadds Ford, Pa.; Frank E. Livingston, Cardiff, Del.

[73] Assignee: Witco Chemical Corporation, New York, N.Y.

[21] Appl. No.: 36,952

[22] Filed: May 7, 1979

[51] Int. Cl.³ .................. C08G 18/14; C08G 18/42
[52] U.S. Cl. ........................... 521/172; 521/99; 525/440; 528/80; 528/307; 260/2.3
[58] Field of Search ............. 525/440; 260/2.3; 521/99, 172; 528/80, 307

[56] References Cited

U.S. PATENT DOCUMENTS 4,048,104  9/1977  Svobada et al. .................. 260/2.3

*Primary Examiner*—H. S. Cockeram
*Attorney, Agent, or Firm*—Albert L. Gazzola; Morton Friedman

[57] ABSTRACT

A waste stream of nonvolatiles is recovered (NVR) as a by-product from the oxidation of cyclohexane to cyclohexanone and cyclohexanol in the process for making adipic acid. The NVR is partially dehydrated, and then reacted with an esterifying polyol to form a polyester polyol product which is useful in producing polyurethane foams. A particularly useful end-product is a rigid polyurethane foam having good cell structure and a density of at least 2.0 lb./cu. ft.

9 Claims, No Drawings

POLYURETHANE FOAMS FROM POLYESTER PRECURSOR DERIVED FROM ADIPIC ACID PROCESS WASTE

This invention relates to making polyurethanes. Specifically this invention relates to a process for obtaining a polyester precursor for making polyurethane foams. More specifically, this invention relates to processing a waste stream of non-volatile residues to obtain a polyester polyol useful in making polyurethane foams.

In the conventional process for the manufacture of adipic acid, such as disclosed in Arthur et al, U.S. Pat. No. 3,365,490 granted Jan. 23, 1968, cyclohexane is oxidized with air to form cyclohexanone and cyclohexanol, as well as a non-volatile residue (NVR). The cyclohexane and cyclohexanol are separated from the residue, and further oxidized with aqueous nitric acid to form adipic acid. The NVR as noted in Arthur et al is non-useful, and Arthur et al seeks to use same for the further production of adipic acid.

Commercial adipic acid processes have usually involved a fractionation of the products from the air oxidation of cyclohexane prior to a nitric acid oxidation step. This fractionation separates out cyclohexanol and cyclohexanone from the non-volatile residue. This residue contains some free adipic acid and esters of adipic acid plus a complex mixture of oxidation products, including other dicarboxylic acids, which under the conditions required for optimum nitric acid oxidation of cyclohexanol and cyclohexanone do not provide an economic source of adipic, glutaric, and succinic acids. One major constituent of the non-volatile residue is epsilon-hydroxycaproic acid, a potential precursor of adipic acid, which is present partially in the form of esters, either the internal ester or lactone, or polymeric esters. Homologous precursors to the dibasic acids such as glutaric and succinic acids are also present. The prior art sought to convert this residue into recoverable adipic, glutaric, and succinic acids.

Today it is common practice to dump literally millions of pounds of NVR annually. This dumping is both costly and ecologically undesirable.

Now by the present invention it has been found that NVR is useful in the present process to produce commercially acceptable polyurethane products.

It is therefore a principal object of this invention to provide a process for making polyurethanes by employing NVR.

It is another object of this invention to provide a process as aforesaid and a commercially desirable rigid foamed product therefrom.

It is still a further object of this invention to provide a process wherein the NVR is converted to a polyester having an acid number sufficient for reaction with a polyisocyanate to form a useful polyurethane.

It is still a further object of this invention to provide a process for rendering the NVR waste stream from the adipic acid process, useful as a starting material in producing polyurethanes.

Broadly speaking, the process of this invention may be considered as reacting an NVR waste stream comprising a mixture of hydroxycaproic acid, monobasic acids and dibasic acids or dibasic acid precursors with an esterifying polyol to form a polyester and mixing the polyester with a polyisocyanate, preferably a diisocyanate, to produce a polyurethane.

In another aspect, this invention is a process for making polyurethane comprising:
 a. oxidizing cyclohexane to form cyclohexanone, cyclohexanol and a non-volatile residue;
 b. separating out the non-volatile residue;
 c. reducing the water content of the non-volatile residue;
 d. reacting the recovered residue from (c) with an esterifying polyol to form a polyester polyol; and
 e. mixing the polyester polyol from (d) with a polyisocyanate to form a polyurethane.

In a more specific aspect of the invention, it has been found that large portions of at least 75% by weight of useful acids, having acid numbers of at least 150 (and preferably 200–300) with low water contents, of less than 15% by weight, are recoverable from commercial NVR waste streams by salting out with NaCl, for instance, or by freezing, as is well known in the art. Such recovered acids are then converted into polyesters having a hydroxyl number of from about 250 to about 500. Surprisingly, such formed polyesters having hydroxyl numbers of from 300 to 425 are useful in the production of rigid urethane foams.

Suitable esterifying polyols useful in reacting with NVR recovered fraction, include mixtures of various pentaerythritol (PE) (e.g. mono- and di-pentaerythritol) and pentaerythritol formals, trimethylolpropane and other polyols having more than two hydroxy groups, for making rigid polyurethanes. The formals include PE cyclic monoformals, for instance, such as,

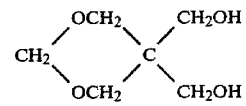

and linear bis PE monoformals, such as,

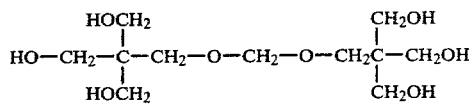

Typically, the polyol will have an OH content of from about 30–35%.

Typically, the NVR may have the following range of mixed acid components:

| Component | Percent by weight (dry basis) |
|---|---|
| ε-hydroxycaproic acid | 30–50% |
| mono-carboxylic acids | 5–40% |
| dibasic acids | 10–30% |

One preferred NVR composition mixture is one which has the following composition:

| Component | Percent by weight (dry basis) |
|---|---|
| ε-hydroxycaproic acid | 43% |
| $C_2$ to $C_6$ monobasic acids | 36% |
| dibasic acids | 21% |

While the composition of the non-volatile residue may vary somewhat, the typical average composition is 65% hydroxy acids, of which more than half consists of epsilonhydroxycaproic acid, 25% dicarboxylic acids, including adipic acid, 5% monocarboxylic acids, and 5% miscellaneous oxidized compounds including cyclohexanol. In general, these compounds are not present in their simplest state in the residue but are present as lactones, salts, and esters.

Often the NVR waste stream from the adipic acid process contains substantial quantities of water, up to about 40% by weight of the NVR. It was found necessary pursuant to the present invention to reduce this water content to less than about 15% by weight of the NVR, as well as reduce the monobasic acid level. It has been found that by salting out with solid sodium chloride equal to an amount of 10% by weight of the water content of the NVR, it was possible to reduce both the water content and the monobasic acid content.

The invention is illustrated but not limited by the following example:

A sample of a non-volatile residue (NVR) from a commercial adipic acid process was obtained having the following composition:

$\epsilon$-hydroxycaproic acid: 43% by weight (dry basis)
$C_2$ to $C_6$ monobasic acids: 36% by weight (dry basis)
dibasic acid precursors: 21% by weight (dry basis)
water: 40%

Solid sodium chloride in an amount of 10% by weight of the water present in the above sample, was added to the sample.

A separation of the sample produced an acid fraction containing 83% by weight of the available acids within the NVR, and had an acid number of 251, and a water content of 13.0% by weight. The second fraction, was acid-poor, having an acid number of only 71.9 and a water content of 68% by weight.

A mixture of 1000 gms. of the acid-rich fraction, 350 grams of a pentaerythritol having a hydroxyl number of 29.0% (solids basis) and 0.13 gm. of tetra-isopropyl titanate was added to a reactor fitted with a nitrogen blanket, air condenser, and water separator tube. The temperature in the reactor was maintained at least at about 200° C. and a vapor temperature of the escaping vapors was maintained above 100° C., and the titanate catalyst was added, to ensure the absence of water in the final reaction product. The reaction mixture was sampled, and when the acid number in the reaction mixture was 2.1 (less than about 5.0), the reaction was terminated and allowed to cool.

The reaction product polyester polyol was found to have the following analysis:

Yield, %: 69.3
Viscosity, at 25° C.: 13,800 cps
Acid No.: 1.1
Water content, %: 0.16
Hydroxyl No.: 347.7

The above polyester polyol was mixed with a polyisocyanate, in the following formulation:

| Components | Parts by weight |
| --- | --- |
| Polyester polyol | 100 |
| Diisocyanate | 89.5 |
| Mono-fluoro-tri-chloromethane (blowing agent) | 33.4 |
| Silicone surfactant | 1.0 |
| Organo-metallic catalyst | 0.3 |
| Amine catalyst | 1.0 | and it was found that the blowing agent was soluble in the polyester polyol; and it was further found that after adding the diisocyanate, the cloudiness of the mixture disappeared and foaming commenced in the clear mixture.

A rigid foam was produced having good cell structure on visual inspection, and a density (ASTM D-1622) of 2.0 to 2.1 lbs./cu.ft., and a stiff structure. This latter aspect was unexpected in view of the fact that the polyester polyol had a hydroxyl number of 347.7 (ASTM D-2849).

Resort may be had to such variations and modifications as fall within the spirit of the invention and the scope of the appended claims.

The embodiments of the invention in which an exclusive property or privilege is claimed are defined as follows:

1. A process for making polyurethane comprising reacting an organic polyisocyanate with a polyester polyol prepared by:
   a. oxidizing cyclohexane to form cyclohexanone, cyclohexanol and a non-volatile residue;
   b. separating out the non-volatile residue;
   c. reducing the water content of the residue to about less than 15% by weight;
   d. reacting the recovered residue from (c) with an esterifying polyol to form a polyester polyol.

2. The process of claim 1, wherein step c. further comprises separating out a fraction having an acid number of at least 150, and wherein the polyester polyol has a hydroxyl number of from 250 to about 500.

3. The process of claim 1, wherein step c. further comprises adding a sodium salt to the non-volatile residue.

4. The process of claim 3, wherein the sodium salt is about 10% by weight of water present in the non-volatile residue.

5. The process of claim 4, further comprising separating an acid-rich fraction of the salted out non-volatile residue from an acid-poor fraction.

6. The process of claim 5, wherein the acid-rich fraction contains at least 75% by weight of the acids present in the non-volatile residue.

7. The process of claim 1, wherein the non-volatile residue comprises substantially $\epsilon$-hydroxy caproic acid, $C_2$ to $C_6$ monobasic and dibasic carboxylic acids.

8. The product produced from the process of claim 1.

9. The product produced from the process of claim 2 wherein the product is a foam having a density of at least 2.0 lb./cu.ft.

* * * * *